United States Patent [19]

Sugiyama et al.

[11] 4,204,960
[45] May 27, 1980

[54] COMBINATION STRAINER AND SUCTION INLET PIPE

[75] Inventors: Masaaki Sugiyama, Fuji; Takuo Yuda, Yokohama, both of Japan

[73] Assignees: Yamakawa Industry Company Ltd.; Nifco Inc., both of Japan

[21] Appl. No.: 938,565

[22] Filed: Aug. 31, 1978

Related U.S. Application Data

[63] Continuation of Ser. No. 847,973, Nov. 2, 1977, abandoned, which is a continuation of Ser. No. 689,705, May 24, 1976, abandoned.

[30] Foreign Application Priority Data

May 26, 1975 [JP] Japan .................. 50-69689

[51] Int. Cl.² .............. B01D 35/02; B01D 35/08
[52] U.S. Cl. .................. 210/232; 210/438; 210/450; 210/462; 55/507; 55/509
[58] Field of Search .............. 210/232, 437, 438, 439, 210/450, 460–463, 497 R, 499, DIG. 11; 55/507, 509; 285/110, 319, DIG. 22

[56] References Cited

U.S. PATENT DOCUMENTS

| 2,253,232 | 8/1941 | Gheen | 285/110 |
| 2,290,403 | 7/1942 | Wyss | 285/110 |
| 2,416,475 | 2/1947 | Friedman | 210/462 |
| 2,521,094 | 9/1950 | Rein | 210/460 |
| 2,641,365 | 6/1953 | Lindeen | 210/460 |
| 2,810,482 | 10/1957 | Kasteen | 210/460 |
| 3,154,487 | 10/1964 | Thornton et al. | 210/438 |
| 3,595,398 | 7/1971 | Cook | 210/462 |
| 3,675,777 | 7/1972 | Heskett et al. | 210/497 |
| 3,833,124 | 9/1974 | Mizusawa et al. | 210/460 |
| 4,014,796 | 3/1977 | Yeda et al. | 210/437 |
| 4,118,323 | 10/1978 | Sugiyama et al. | 210/439 |

FOREIGN PATENT DOCUMENTS

| 831430 | 3/1960 | United Kingdom | 210/437 |
| 835723 | 5/1960 | United Kingdom | 285/110 |

Primary Examiner—David L. Lacey
Attorney, Agent, or Firm—Jack R. Halvorsen; Robert W. Beart

[57] ABSTRACT

Disclosed is a cylindrical closed strainer molded of a plastic in a unitary structure, which comprises a top plate, a bottom plate disposed opposite said top plate at a fixed interval therefrom and a cylindrical net stretched between the peripheries of said top plate and bottom plate, said top plate being possessed of snap fastening means on the upper surface thereof and provided with a through hole which has a diameter larger than the outside diameter of a suction pipe intended to be connected with the strainer body and is provided on the inner circumference of said through hole with a thin seal member coaxially containing a circular hole of a diameter smaller than said outside diameter of the suction pipe. Said suction pipe is provided with a flange which is adapted to rest stably on the upper surface of said top plate. When the suction pipe is forcibly inserted through the circular hole of said seal member until the fastening means of the top plate snap into fast engagement with the flange, the suction pipe and the strainer body are united with force enough to defy inadvertent separation.

4 Claims, 4 Drawing Figures

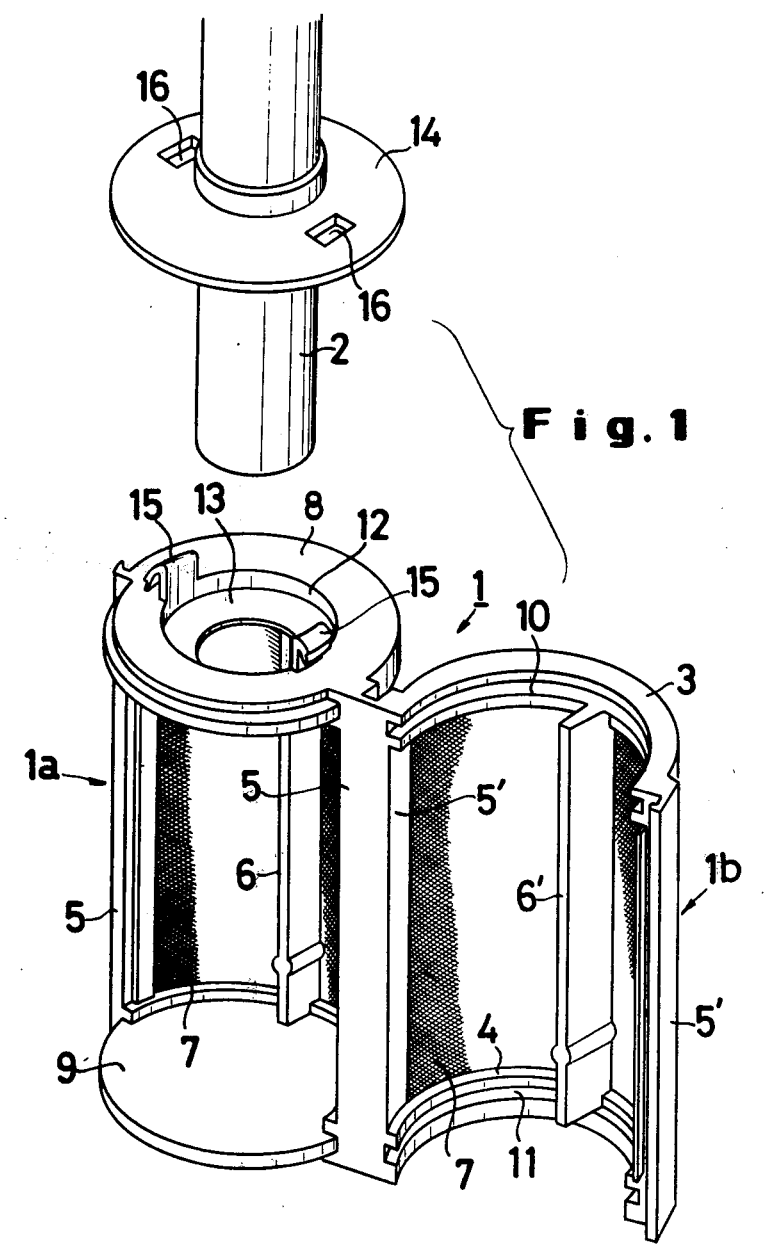

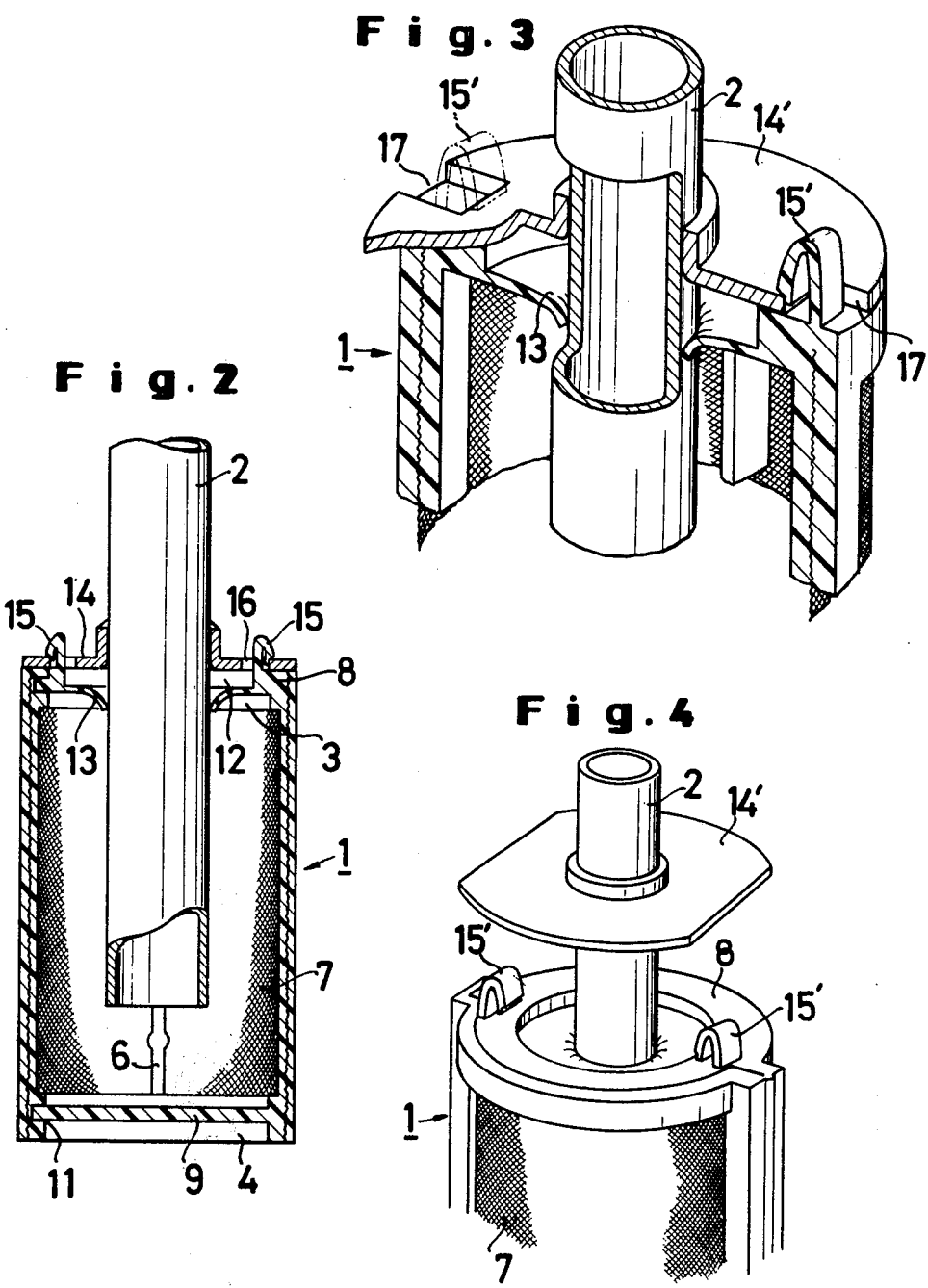

COMBINATION STRAINER AND SUCTION INLET PIPE

This is a continuation of application Ser. No. 847,973, filed Nov. 2, 1977, now abandoned, which is a continuation of Ser. No. 689,705 filed May 24, 1976 now abandoned.

BACKGROUND OF THE INVENTION

This invention relates to a strainer of the type to be used for the filtration of liquids, particularly for attachment to the free end of a suction pipe inserted into a gasoline tank so as to prevent said suction pipe from admitting impurities.

Strainers of this type developed heretofore have generally consisted of a cylindrical metallic frame and a metal net wrapped around the frame or of a cylindrical plastic frame having a plastic net stretched inside said frame. A strainer having a metallic structure is difficult to assemble and inevitably proves to be expensive. Such a metallic strainer does not permit easy replacement because the required union between the suction pipe and the strainer body is generally obtained by soldering. Thus it cannot be mass produced. A strainer having a plastic structure is generally of such a configuration that the top plate and bottom plate cannot be molded in a unitary form with the cylindrical strainer frame. Other strainer structures which are difficult to use in separating the suction pipe from the strainer body include: structures where the suction pipe is fastened to the strainer body by use of adhesive, and structures where the opening formed in the strainer body to permit insertion of the suction pipe and the portion of the suction pipe brought into engagement therewith are provided respectively with a protuberance and a matching groove. Those strainers, having structures such as those described above, have a disadvantage in that the strainer body and the suction pipe cannot be connected stably with each other unless the diameter of the through hole formed in the top plate of the strainer and the outside diameter of the suction pipe are perfectly equal to each other otherwise, because of a gap formed therebetween, the strainer body permits inflow of impurities.

A primary object of the present invention is to provide a strainer capable of being easily connected to a matching suction pipe with perfect airtightness while also being freely detachable therefrom.

Another object of this invention is to provide a strainer easily shaped in a unitary structure by injection molding of a plastic.

SUMMARY OF THE INVENTION

To accomplish the objects described above, the present invention provides a strainer comprising a top plate, a bottom plate disposed opposite said top plate at a fixed interval therefrom by suitable rigid columns and a cylindrical net stretched between the peripheries of said top plate and bottom plate, said top plate being possessed of snap fastening means on the upper surface thereof and provided with a through hole which has a diameter larger than the outside diameter of a suction pipe intended to be connected with the strainer body and said hole is provided on the inner circumference thereof with a thin seal member coaxially containing a circular hole of a diameter smaller than said outside diameter of the suction pipe. The suction pipe, on the other hand, is provided with a flange adapted to rest stably on the upper surface of said top plate of the strainer body. Because of their structures, the strainer body and the suction pipe are united with force enough to defy inadvertent separation when the suction pipe is forcibly inserted through the seal member within the through hole of the top plate of the strainer until the fastening means on the upper surface of the top plate snap into fast engagement with the flange of the suction pipe.

Accordingly, the connection between the strainer body and the suction pipe is obtained with perfect certainty and, what is more, the airtightness with which they are united with each other is enhanced by the seal member. The strainer can be easily replaced with a new one because the union is readily broken when the flexible fastening means are pushed toward each other by an external force. Further the strainer body can easily be molded as a unitary initially open structure when the metal dies to be used for the molding have adjacent cavities which perfectly conform with the contours to be assumed by the strainer as if it were vertically cut in half and spread apart as illustrated in the drawing.

The other objects and characteristic features of the present invention will become apparent from the description to be given in further detail herein below with reference to the accompanying drawings.

BRIEF DESCRIPTION OF THE DRAWINGS

FIG. 1 is an expanded perspective view of one preferred embodiment of the strainer of the present invention in its initially formed state before assembly;

FIG. 2 is a partially cutaway longitudinal cross section of the strainer of FIG. 1 in assembled relation and having the suction pipe inserted in its working position.

FIG. 3 is a perspective view in partial section illustrating another preferred embodiment of means for providing engagement between the suction pipe flange and the strainer body.

FIG. 4 is a partial perspective view illustrating a further embodiment of means for providing engagement between the suction pipe flange and the strainer body.

DESCRIPTION OF THE PREFERRED EMBODIMENTS

The accompanying drawings illustrate a preferred embodiment of the strainer of this invention for use in the filtration of liquids. FIG. 1 illustrates the strainer with the suction pipe 2 poised for ready insertion into a strainer body 1. In this preferred embodiment, said strainer body in its original unassembled form is molded of a plastic material in a unitary structure comprising two shells 1a, 1b corresponding to two halves of a cylinder. Said shells 1a, 1b both have a semicircular cross section. The shell 1a is provided with a top plate 8 and a bottom plate 9 respectively at the upper and lower extremities thereof and the other shell 1b is provided with semicircular frames 3 and 4 respectively at the upper and lower extremities thereof. Longitudinal support columns 5, 5 and 5', 5' are extended between the top plate 8 and bottom plate 9 of the shell 1a and between the upper and lower frames 3 and 4 of the shell 1b and, in addition thereto, longitudinal ribs 6, 6' are located medially between said support columns so that each shell approximates the shape of semi-cylinder. These two shells are shaped in a unitary form by injection molding of a plastic material such as of nylon. In the actual shaping, the two shells are molded in a unitary form within one metal die with the members of each pair of longitudinal support columns 5 and 5' adjacent to each other. Also during this shaping, one-piece net 7 is placed inside each of the molding dies and the plastic material in a molten state is forced therein so that this net 7 will be embedded in said longitudinal support columns and ribs at the time that the two shells are molded. Consequently, the two shells are shaped in a unitary form having the net stretched adjacent the peripheral faces of the shells and with said two shells formed with the members 5, 5' of each pair of longitudinal support columns in adjacent side-by-side hinged relationship. Thus, the two shells are joined with each other by the medium of the plastic material and the net embedded therein. By utilizing this embedded net as a joint reinforcement, said two shells are joined with each other so as to be freely opened and closed along the hinge formed at the boundary of the one pair of adjacent longitudinal support columns 5 and 5' as initially molded.

In the two shells of a structure such as is described above, the lateral surfaces of the upper and lower frames 3 and 4 of the shell 1b with which the edges of the top plate 8 and the bottom plate 9 of the other shell 1a are to be engaged when one of the shells is closed onto the other shell about the hinge-like boundary of the adjoining longitudinal support columns 5, 5', are provided with grooves 10 and 11 respectively for receiving the edges of said top plate 8 and bottom plate 9. This ensures positive engagement of said edges and consequently provides substantially rigid assembly of the strainer body. When the two shells are closed about the hinge-like boundary of the adjoining longitudinal support columns 5, 5' and brought into intimate contact, interlocking protuberances are provided on the remaining outboard longitudinal support columns 5, 5' along their opposed edges to serve as joining means for retaining the shells in closed relation as the assembled strainer and to further prevent said shells from separating.

In the strainer body 1 thus assembled, said upper plate 8 is provided with a through hole 12 adapted to permit insertion of a suction pipe 2.

Said through hole 12 is formed with a diameter larger than the outside diameter of said suction pipe so that it will readily pass the suction pipe. From the inner circumference of this through hole 12, there extends inwardly an annular thin seal member 13 having a co-axial circular hole of a diameter smaller than said outside diameter of the suction pipe. The suction pipe which is inserted into the through hole 12 is further pushed forcibly past said annular hole of small diameter in seal member 13. The seal member 13, because of the resiliency thereof, tightens itself around the suction pipe penetrating therethrough. On the upper surface of said top plate 8, fastening means 15 which are adapted to snap into fast engagement with a flange 14 formed on the periphery of the suction pipe 2 are integrally disposed. As said flange 14 comes to rest stably on the upper surface of the top plate 8 in consequence of the insertion of said suction pipe, the snap fastening means firmly grip the flange 14 and consequently prevent the inserted suction pipe 2 from being inadvertently released.

In the illustrated preferred embodiment, the snap fastening means 15, 15 are disposed diametrically opposite each other across the through hole 12 each of said fastening means includes an integral rigid first leg disposed substantially normal to said plate 8 and a reversely bent resilient second leg extending toward plate 8 on the side opposite hole 12 and terminating short of said plate 8, with said second legs each carrying shoulder means spaced from plate 8 a distance at least equal to the thickness of flange 14. The flange 14 of said suction pipe includes perforations 16, 16 for receiving said snap fastening means 15 at spaced positions corresponding to the spacing of said snap fastening means 15, so that when the flange 14 comes into tight contact with the upper surface of the top plate 8, fastening means 15 are admitted through the perforations 16, 16 and allowed to snap into fast engagement with the flange. When the suction pipe is required to be separated from the strainer, however, the desired separation can readily be obtained by exerting an external force to have the second legs of fastening means 15 converge toward each other. In the preferred embodiment illustrated in FIG. 1, these fastening means are so positioned that the rear surfaces thereof perfectly conform with the margins of the through hole 12. This is not the only form of structure which the fastening means can assume. They may, for instance, be disposed approximately in the middle of the radial extent of the upper annular surface of the top plate as opposed to their illustrated position along one edge.

FIGS. 3 and 4 illustrate another preferred embodiments wherein a top plate 8 is adapted to come into intimate contact with a flange 14 fixed on the suction pipe. According to the device of this particular embodiment, the airtightness with which the strainer body and the suction pipe are united can be improved to a greater extent. As is plain from the drawings, the second legs of fastening means 15 are disposed in a direction opposite the direction in which their counterparts are disposed in the preferred embodiment of FIG. 1. These fastening means 15', therefore, are brought into fast engagement with the edge of the flange 14'. To permit this engagement, the flange 14' may be formed with an outside diameter smaller than the diameter of the top plate 8 or may be provided with notches 17 as illustrated in FIG. 3, or may assume an elliptical shape or some other similar shape as illustrated in FIG. 4. The union between the strainer body and the suction pipe, accordingly, is ensured not merely by the grip of said seal member 13 but also by the intimate contact of the flange 14' with the upper surface of the top plate 8.

Further, the flange 14 is required to be formed of a metallic material and welded in advance at a fixed position on the suction pipe.

Owing to the structure described above, when the suction pipe 2 is inserted into the strainer body 1 having a net 7 stretched adjacent the peripheral surface thereof, the insertion is easily obtained and at the same time the seal member 13 tightens itself fast on the inserted suction pipe 2 because the through hole 12 formed in the top plate of the strainer body 1 is given a diameter greater than the outside diameter of the suction pipe 2 and also because the seal member 13 extended inwardly from the inner circumference of said through hole 12 is pressed against the outer surface of the suction pipe 2. Thus, the union of the strainer body and the suction pipe allows for no gap which may admit impurities from outside. Moreover, the fact that the diameter of the through hole 12 is larger than the outside diameter of the suction pipe 2 and the hole contained in the seal member 13 disposed along the inner circumference of said through hole 12 has a diameter smaller than said outside diameter of pipe 2 so that the seal member can manifest its resiliency to advantage during the passage therethrough of the suction pipe implies that possible tolerance variations in pipe diameter will be made up for by the ample diameter of said through hole 12 coupled with the resiliency of the seal member 13, indicating further that the acceptable range of dimensional accuracy of products will be enlarged. This is equivalent to a statement that suction pipes are no longer required to be formed in an exactly identical diameter, rendering the production of strainer bodies and suction pipes extremely easy and improving the productivity as much.

According to the present invention, the suction pipe 2 which has been inserted into the strainer body 1 is further pushed ahead until the flange 14 disposed on the suction pipe 2 is pressed against the upper surface of the top plate 8 of the strainer body 1 and the fastening means 15 on the strainer body readily snap into engagement with the flange and preclude inadvertent separation of the suction pipe 2 from the strainer body 1. Because of this particular structure, assembly of the two components is obtained very easily and the productivity of the strainer is enhanced to a notable extent.

As described above, the strainer according to the present invention is markedly improved in economies in production and assembly leading to improved performance over conventional strainers. It is not affected by a slight variation in the outside diameter of suction pipe, and it permits fast assembly to be established between the strainer body and the suction pipe inserted therein. Thus, the strainer of this invention proves to be advantageous in numerous respects.

In the foregoing preferred embodiment, the strainer body has been described as being of a type shaped in an opened form. This invention is not limited of this type of shaping. Although the flange to be provided on the suction pipe is depicted in the shape of a circle, it is not limited to such circular shape, the sole purpose thereof is to permit fast engagement of the fastener means formed on the top plate of the strainer body. Also as regards the fastener means, the number and shape thereof are not limited to those which are shown in the drawing.

What is claimed is:

1. A one-piece strainer in combination with a metallic suction pipe of predetermined diameter having an open free end and having a metallic flange at a predetermined length from said free end, said strainer including two mating generally symmetrical semi-cylindrical body portions, one of said body portions terminating with an integral annular top plate having a centrally disposed through hole therein greater in size than said predetermined pipe diameter, said one body portion also having an integral imperforate bottom plate spaced from said top plate a distance greater than said predetermined length of said pipe from said flange to said free end, said one body portion further including circumferentially spaced substantially rigid column means maintaining said plates in spaced relationship, an integral injection molded resilient thin seal member having a substantially uniform thickness and extending radially inwardly from the margins of said top plate central through hole, said resilient thin seal member having a central co-axially disposed aperture defining a flexible thin inner margin having a diameter less than said predetermined pipe diameter and adapted to be deflected axially to sealingly grip said pipe when said pipe is axially telescoped therein, resilient snap fastener means extending substantially axially from said top plate and including shoulder means facing said top plate in spaced relation thereto whereby said shoulder means lockingly cooperate with said flange carried by said pipe when said flange is seated on said top plate, the second of said body portions including top and bottom semi-cylindrical elements having internal grooves for mating with said top and bottom plates, said elements maintained in spaced relation by circumferentially spaced substantially rigid column members, hinge means joining one of said column members disposed at an edge of said one body portion throughout a substantial portion of its length to one of said column members disposed at an edge of said second body portions, filtration net means embedded in and extending axially between said top and bottom plates and axially between said semi-cylindrical top and bottom elements and embedded at spaced points in said column members and said hinge, and locking means carried by said body portions for forming a cylindrical closed strainer chamber when said body portions are moved into locking matched relation by movement about said hinge, whereby said body portions are locked in closed sealing relation except for the aperture in the sealing member which accepts the pipe in sealed relation and the net for filtration purposes.

2. The combination according to claim 1, wherein said flange includes perforations for receiving said snap fastener means.

3. The combination according to claim 1, wherein said flange includes notches for fast engagement with said snap fastener means.

4. The combination according to claim 1, wherein said flange is formed in a generally elliptical shape having two opposed flat edges adapted to be engaged by said snap fastener means.

* * * * *